US008731597B1

(12) United States Patent
Vargantwar et al.

(10) Patent No.: US 8,731,597 B1
(45) Date of Patent: May 20, 2014

(54) METHOD AND SYSTEM OF TRANSMITTING POWER CONTROL COMMANDS

(75) Inventors: Sachin R. Vargantwar, Overland Park, KS (US); Manoj Shetty, Mumbai (IN); Deveshkumar Rai, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 237 days.

(21) Appl. No.: 13/116,168

(22) Filed: May 26, 2011

(51) Int. Cl.
*H04W 74/00* (2009.01)

(52) U.S. Cl.
USPC ......... 455/522; 455/69; 455/13.4; 455/67.13; 455/127.5; 370/318; 370/352; 713/320

(58) Field of Classification Search
USPC ......... 455/522, 69, 13.4, 67.13, 127.1–127.5, 455/343.4; 370/310, 318, 352; 713/320
See application file for complete search history.

(56) References Cited

U.S. PATENT DOCUMENTS

| | | | |
|---|---|---|---|
| 5,991,627 A * | 11/1999 | Honkasalo et al. | 455/437 |
| 6,208,873 B1 | 3/2001 | Black et al. | |
| 6,256,301 B1 | 7/2001 | Tiedemann, Jr. et al. | |
| 6,987,982 B2 | 1/2006 | Willenegger et al. | |
| 7,307,977 B1 * | 12/2007 | Eran et al. | 370/342 |
| 7,515,923 B2 * | 4/2009 | Lee et al. | 455/522 |
| 2003/0054850 A1 * | 3/2003 | Masseroni et al. | 455/522 |
| 2004/0092233 A1 | 5/2004 | Rudrapatna | |
| 2005/0143113 A1 | 6/2005 | Lee et al. | |
| 2005/0153671 A1 | 7/2005 | Ichikawa | |
| 2007/0191044 A1 | 8/2007 | Kostic et al. | |
| 2008/0229125 A1 * | 9/2008 | Lin et al. | 713/300 |
| 2010/0189256 A1 * | 7/2010 | Doehla et al. | 380/217 |
| 2012/0252474 A1 * | 10/2012 | Tiirola et al. | 455/450 |

* cited by examiner

*Primary Examiner* — Shaima Q Aminzay

(57) ABSTRACT

A power control command (PCC) transmission scheme is disclosed. In one embodiment, the PCC transmission scheme may involve an access network engaging in a respective existing communication session with each of a plurality of existing access terminals and sending a respective existing series of power control commands (PCCs) directed to a respective existing access terminal according to a respective existing time schedule. The transmission scheme may further involve the access network deciding to initiate a new communication session with a new access terminal and, in response to the deciding, assigning a new time schedule for sending a new series of PCCs directed to the new access terminal that differs from at least one respective existing time schedule. The transmission scheme may further involve engaging in the new communication session with the new access terminal and sending the new series of PCCs according to the new time schedule.

20 Claims, 7 Drawing Sheets

METHOD AND SYSTEM OF TRANSMITTING POWER CONTROL COMMANDS

BACKGROUND

To provide cellular wireless communication service, a wireless service provider typically employs an access network that functions to connect one or more access terminals (e.g., cell phones, PDAs, laptops, netbooks, tablets, and/or other wirelessly-equipped devices) with one or more transport networks. In a typical access network, an area is divided geographically into a number of coverage areas, such as cells and sectors, each defined by a radio frequency (RF) radiation pattern from a respective base transceiver station (BTS). Within each coverage area, the BTS's RF radiation pattern may provide one or more wireless links, each on a carrier (or set of carriers), over which access terminals may communicate with the access network. In turn, the access network may provide connectivity with the public switched telephone network (PSTN), the Internet, and/or other transport networks.

The wireless links may carry communications between the access network and the access terminals according to any of a variety of wireless protocols. Depending on the protocol employed, each wireless link may also be divided into a plurality of channels for carrying communications between the access network and the access terminals. For example, each wireless link may include a plurality of forward-link channels, such as forward traffic channels, for carrying communications from the access network to the access terminals. As another example, each wireless link may include a plurality of reverse-link channels, such as reverse traffic channels, for carrying communications from the access terminals to the access network.

In many wireless protocols, while the access network and an access terminal are engaging in a communication session on a single wireless link, the access network and the access terminal may engage in default power-control processes to control transmission power on the wireless link for the communication session. In particular, the access network and the access terminal may engage in a reverse default power-control process to control the reverse transmission power at which the access terminal sends bearer data for the communication session on an established reverse traffic channel of the wireless link. Similarly, the access terminal and the access network may engage in a forward default power-control process to control the forward transmission power at which the access network sends bearer data for the communication session on an established forward traffic channel of the wireless link.

In an example default power-control process, a power-controlling entity may send a series of power control commands (PCCs) directed to a power-controlled entity on the wireless link, each of which instructs the power-controlled entity to adjust its transmission power on the wireless link for the communication session. To facilitate sending each such PCC, the power-controlling entity may determine a channel quality at which the wireless link is carrying the communication session and compare the determined channel-quality to a threshold channel-quality. Based on that comparison, the power-controlling entity may decide to send either a "power up" PCC that instructs the power-controlled entity to increase its transmission power on the wireless link for the communication session (if the determined channel-quality is less than the threshold channel-quality) or a "power down" PCC that instructs the power-controlled entity to decrease its transmission power on the wireless link for the communication session (if the determined channel-quality is greater than the threshold channel-quality).

As the power-controlling entity sends the series of PCCs directed to the power-controlled entity, the power-controlled entity may receive PCCs from the series of PCCs sent by the power-controlling entity. As it receives these PCCs, the power-controlled entity may responsively adjust its transmission power for the communication session on the wireless link. For instance, in response to receiving a "power up" PCC from the power-controlling entity, the power-controlled entity may increase its transmission power for the communication session on the wireless link. And in response to receiving a "power down" PCC from the power-controlling entity the power-controlled entity may decrease its transmission power for the communication session on the wireless link.

In certain protocols, an access network and an access terminal may also be capable of entering a "soft-handoff state" during which they engage in a communication session on multiple wireless links concurrently. While engaging in the communication session on the multiple wireless links, the access network and the access terminal may then engage in soft-handoff power-control processes to control transmission power on each of the multiple wireless links carrying the communication session.

In an example soft-handoff power-control process, a power-controlling entity may send a respective series of PCCs directed to a power-controlled entity on each of the multiple wireless links concurrently. For example, the power-controlling entity may send a first series of PCCs directed to the power-controlled entity on a first wireless link, a second series of PCCs directed to a power-controlled entity on a second wireless link, etc. To facilitate sending each such PCCs on each of the multiple wireless links, the power-controlling entity may use techniques similar to those described above with reference to the default power-control process.

As the power-controlling entity sends the respective series of PCCs directed to the power-controlled entity on each of the multiple wireless links concurrently, the power-controlled entity may receive PCCs from the respective series of PCCs sent by the power-controlling entity on each of the multiple wireless links. As it receives these PCCs, the power-controlled entity may responsively adjust its respective transmission power for the communication session on each of the multiple wireless links in a coordinated manner. For instance, in response to concurrently receiving a "power up" PCC from the power-controlling entity on all of the multiple wireless links (which indicates that the power-controlling entity is detecting a lower channel quality on all of the multiple wireless links), the power-controlled entity may increase its respective transmission power on all of the multiple wireless links. Further, in response to concurrently receiving a "power down" PCC from the power-controlling entity on any one or more of the multiple wireless links (which indicates that the power-controlling entity is detecting a higher channel quality on at least one of the multiple wireless links), the power-controlled entity may decrease its transmission power on all of the multiple wireless links.

Advantageously, the power-control processes described above may enable the access network and access terminals to balance between maintaining an acceptable strength of a traffic-channel communication and preventing the traffic-channel communication from becoming overly strong and unduly interfering with other communications.

OVERVIEW

Generally, a power-controlling entity may send power control commands (PCCs) on a wireless link at a power level that is substantially similar to the power level at which the power-controlling entity sends bearer data on the wireless link. In certain circumstances, however, the power-controlling entity may send PCCs on a wireless link at an increased power level relative to the power level at which the power-controlling entity sends bearer data on the wireless link.

In one such circumstance, upon entering a soft-handoff state, a power-controlling entity may be configured to increase the respective power level at which to send PCCs directed to the power-controlled entity on each of multiple wireless links by a predefined offset that correlates to the number of wireless links carrying the communication session (e.g., 2 dB for 2 wireless links, 3 dB for 3 wireless links, etc.). For instance, if the power-controlling entity and the power-controlled entity are initially engaging in the communication session on a single wireless link, the power-controlling entity may send a series of PCCs directed to the power-controlled entity on the single wireless link at a baseline power level that is equal to the power level at which the power-controlling entity sends bearer data to the power-controlled entity on the single wireless link. Thereafter, if the power-controlling entity and power-controlled entity begin engaging in the communication session on multiple wireless links, the power-controlling entity may send respective series of PCCs directed to the power-controlled entity on each of the multiple wireless links at a respective increased power level that is a predefined offset higher than the respective power level at which the power-controlling entity sends the bearer data for the communication session on each of the multiple wireless links.

By sending PCCs on a wireless link at an increased power level relative to the power level at which it sends bearer data on the wireless link (e.g., according to the example mechanism described above), a power-controlling entity may reduce the likelihood of the power-controlled entity failing to receive PCCs and thereby improve the overall effectiveness of the power-control process. However, the increased power level at which the power-controlling entity sends these PCCs may, in some instances, have negative effects on the performance of the access network as a whole.

One such negative effect is an increase in the power utilization on a given wireless link (i.e., a total amount of power used on the wireless link divided by a maximum allowable power of the wireless link). Typically, an access network engages in active communication with, and thus sends respective series of PCCs directed to, several different active access terminals on a given wireless link. And typically, the access network sends the respective series of PCCs directed to the active access terminals according to the same time schedule (e.g., the same reference clock and the same rate), in which case the access network periodically makes a simultaneous transmission of a respective PCC directed to each of the active access terminals. Thus, when the access network increases the power level at which to send PCCs directed to one or more of the active access terminals on the given wireless link within this configuration (e.g., according to the example mechanism described above), the access network's periodic, simultaneous PCC transmissions may cause "spikes" in the power utilization on the given wireless link.

As the magnitude of these spikes increases (e.g., due to an increase in soft-handoff communications carried by the given wireless link), the overall power utilization of the given wireless link may correspondingly increase. If this overall power utilization ultimately rises above a threshold level (e.g., 80%), the access network may then begin "power blocking" any new communications on the given wireless link until the overall power utilization falls back below the threshold level, thereby negatively affecting the performance of the access network as a whole. For at least this reason, a more intelligent PCC transmission scheme that reduces the magnitude of spikes in the power utilization of a given wireless link is desirable. Such a PCC transmission scheme would be particularly beneficial in circumstances where a power-controlling entity is sending increased-power PCCs directed to several power-controlled entities on the given wireless link.

Disclosed herein is such a PCC transmission scheme. According to the disclosed PCC transmission scheme, the access network may be configured to send PCCs directed to access terminals on a given wireless link according to differing time schedules, so as to reduce the likelihood of simultaneously transmitting a respective PCC directed to multiple access terminals. This reduction in the likelihood of simultaneous PCC transmissions may correspondingly reduce the magnitude of spikes in the power utilization of a given wireless link, which may reduce the likelihood of power blocking on the wireless link.

One embodiment of the exemplary PCC transmission scheme may take the form of a method that includes (a) engaging in a first communication session with a first access terminal, wherein engaging in the first communication session comprises sending a first series PCCs directed to the first access terminal according to a first time schedule, (b) deciding to initiate a second communication session with a second access terminal, (c) in response to the deciding, assigning a second time schedule for sending a second series of PCCs directed to the second access terminal, wherein the second time schedule differs from the first time schedule, and (d) engaging in the second communication session with the second access terminal, wherein engaging in the second communication session comprises sending the second series of PCCs according to the second time schedule.

The feature of engaging in the first communication session may take the form of sending a first series of frames according to a first reference clock, each frame in the first series of frames having a series of timeslots. Similarly, the feature of engaging in the second communication session may take the form of sending a second series of frames according to a second reference clock, each frame in the second series of frames having a series of timeslots.

The feature of sending the first series of PCCs according to the first time schedule may take the form of sending a respective PCC in a first position of each respective timeslot in the first series of frames. Similarly, sending the second series of PCCs according to the second time schedule may take the form of sending a respective PCC in a second position of each respective timeslot in the second series of frames.

The feature of assigning the second time schedule may take various forms. In one aspect, assigning the second time schedule may take the form of selecting the second reference clock to be substantially similar to the first reference clock and selecting the second position to be different from the first position. Selecting the second position may in turn take various forms.

In one example, selecting the second position may take the form of selecting the second position to be adjacent to the first position. In another example, selecting the second position may take the form of selecting the second position to be a predefined number of positions after the first position.

In another aspect, assigning the second time schedule may take the form of selecting the second reference clock to be different from the first reference clock and selecting the second position to be substantially similar to the first position. In one example, selecting the second reference clock to be different from the first reference clock may take the form of selecting the second reference clock to be a predefined amount of time after the first reference clock.

Another embodiment of the exemplary PCC transmission scheme may take the form of a method that includes (a) engaging in a respective existing communication session with each of a plurality of existing access terminals, wherein engaging in each such respective existing communication session comprises sending a respective existing series of PCCs directed to a respective existing access terminal according to a respective existing time schedule, (b) deciding to initiate a new communication session with a new access terminal, (c) in response to the deciding, assigning a new time schedule for sending a new series of PCCs directed to the new access terminal, wherein the new time schedule differs from at least one respective existing time schedule for sending a respective existing series of PCCs directed to a respective existing access terminal, and (d) engaging in the new communication session with the new access terminal, wherein engaging in the new communication session comprises sending the new series of PCCs according to the new time schedule.

The feature of engaging in a respective existing communication session with an existing access terminal may take the form of sending a respective series of frames to the existing access terminal according to a respective reference clock, each frame comprising a series of timeslots. Similarly, the feature of engaging in the new communication session may take the form of sending a new series of frames to the new access terminal according to a new reference clock, each frame comprising a series of timeslots.

The feature of sending a respective existing series of PCCs directed to the existing access terminal according to a respective existing time schedule may take the form of sending a respective PCC in a respective position of each respective timeslot in the respective series of frames. Similarly, sending the new series of PCCs according to the new time schedule may take the form of sending a respective PCC in a new position of each respective timeslot in the new series of frames.

The feature of assigning the second time schedule may take various forms. In one aspect, assigning the new time schedule may take the form of selecting the new reference clock to be substantially similar to at least one respective reference clock of a respective access terminal and selecting the new position to be different than at least one respective position.

In one instance, selecting the new position may take the form of selecting the new position to be adjacent to a last assigned position. In another instance, selecting the new position may take the form of selecting the new position from a group of unassigned positions. In either instance, selecting the new reference clock to be substantially similar to at least one respective reference clock may involve selecting the new reference clock to be substantially similar to each respective reference clock.

In another aspect, assigning the new time schedule may take the form of selecting the new reference clock to be different from at least one respective reference clock of a respective access terminal and selecting the new position to be the same as at least one respective position of a respective access terminal.

In one instance, selecting the new reference clock to be different from at least one respective reference clock of a respective access terminal may take the form of selecting the new reference clock to be different from each respective reference clock. In another instance, selecting the new reference clock may take the form of selecting the new reference clock to be delayed a predefined amount of time relative to a respective reference clock. In yet another instance, selecting the new reference clock may take the form of selecting the new reference clock to be delayed an amount of time that is selected from a group of unassigned delay amounts.

Also disclosed herein is a base station that includes (a) a first communication interface configured to facilitate a first communication with a first access terminal on a given wireless link and to facilitate a second communication session with a second access terminal on the given wireless link, (b) a second communication interface configured to facilitate communication with one or more access network entities, (c) a processor, (d) data storage, and (e) program instructions stored in data storage and executable by the processor to carry out the features described herein.

These as well as other aspects and advantages will become apparent to those of ordinary skill in the art by reading the following detailed description, with reference where appropriate to the accompanying drawings.

DETAILED DESCRIPTION

I. Communications System

Figure 1:
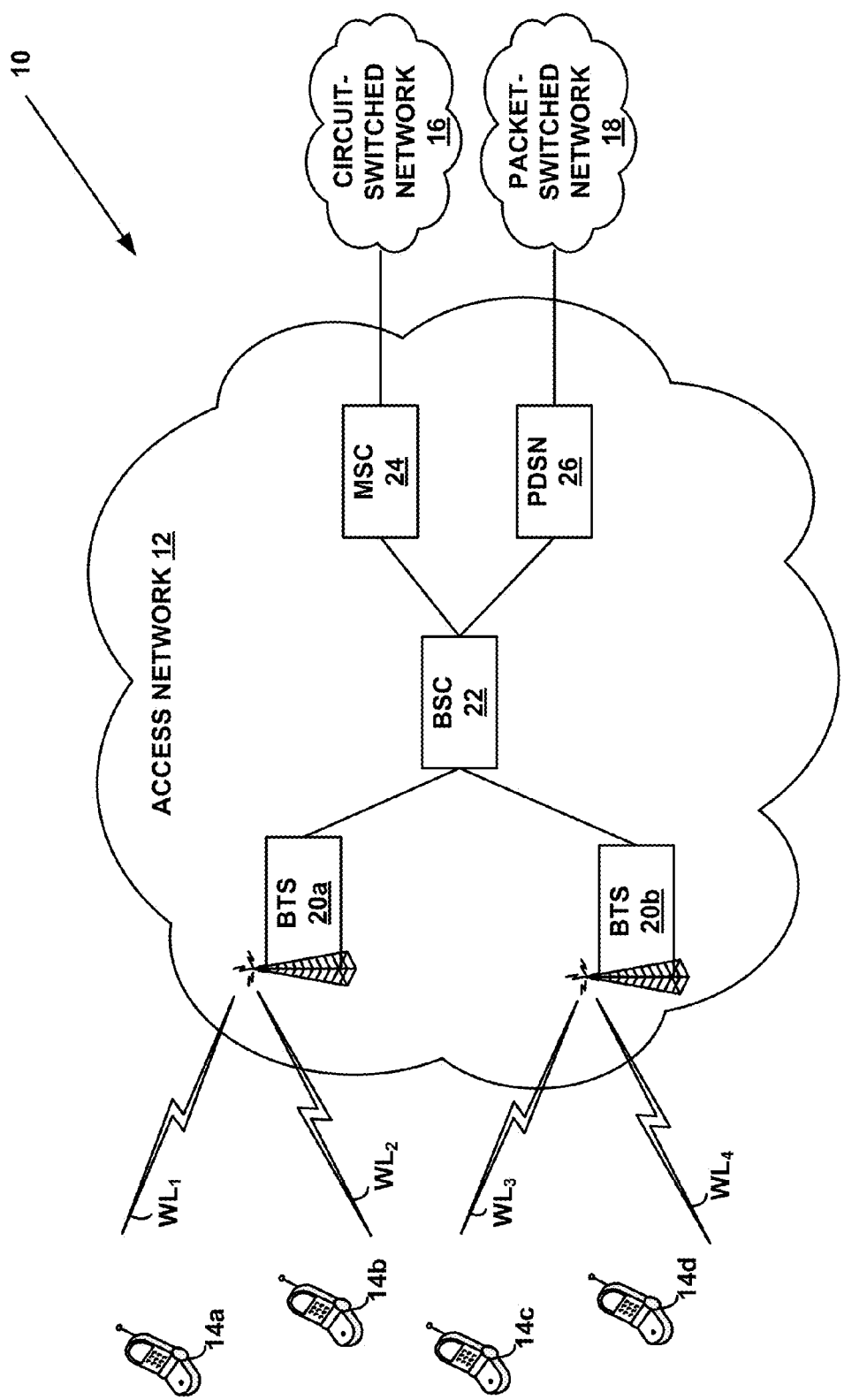
FIG. 1 is a simplified block diagram of a communication system in which an exemplary power control command (PCC) transmission scheme can be implemented.

FIG. 1 is a simplified block diagram of a communication system in which an exemplary power control command (PCC) transmission scheme can be implemented. As shown, the system 10 may include an access network 12 that functions to provide connectivity between one or more access terminals, such as access terminals 14a-d, and one or more transport networks, such as a circuit-switched network 16 (e.g., the Public Switched Telephone Network (PSTN)) and a packet-switched network 18 (e.g., the Internet).

It should be understood that the arrangements described herein are set forth for purposes of example only. As such, those skilled in the art will appreciate that other arrangements and other elements (e.g., machines, interfaces, functions, orders of functions, etc.) can be used instead, some elements may be added, and some elements may be omitted altogether.

Further, as in most telecommunications applications, those skilled in the art will appreciate that many of the elements described herein are functional entities that may be implemented as discrete or distributed components or in conjunction with other components, and in any suitable combination and location. Still further, various functions described herein as being performed by one or more entities may be carried out by hardware, firmware and/or software logic. For instance, various functions may be carried out by a processor executing a set of machine language instructions written in any suitable programming language (e.g., C, C++, Java, etc.) and stored in memory.

As shown in FIG. 1, access network 12 may include one or more base transceiver stations (BTSs), such as BTS 20a and BTS 20b. (Although FIG. 1 depicts access network 12 as including two BTSs, it should be understood that access network 12 may include more than two BTSs.) Each BTS may be any entity that facilitates wireless communication between access network 12 and one or more access terminals, such as access terminals 14a-d. In particular, each BTS may radiate to define one or more wireless coverage areas, such as a sector and/or sectors. Within each of its coverage areas, each BTS may provide one or more wireless links over which one or more access terminals may communicate with the BTS. For example, as shown, BTS 20a may be configured to provide a first wireless link $WL_1$ and a second wireless link $WL_2$, and BTS 20b may be configured to provide a third wireless link $WL_3$ and a fourth wireless link $WL_4$. Various other configurations are possible as well. Each BTS may also control aspects of wireless communication with access terminals 14a-d, such as aspects of connection establishment, handoff, and/or power control for instance. Each BTS may perform other functions as well.

Each wireless link may carry communications between access network 12 and access terminals 14a-d according to any of a variety of protocols, including EIA/TIA/IS-856 Rel. 0, Rev. A, or other versions thereof ("IS-2000"), EIA/TIA/IS-856 Rel. 0, Rev. A, or other versions thereof ("IS-856"), iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), Bluetooth, infrared, or other protocols now known or later developed. Further, each wireless link may be divided into a forward link for carrying communications from access network 12 to the one or more access terminals 14a-d and a reverse link for carrying communications from the one or more access terminals 14a-d to access network 12. In turn, each forward link and each reverse link may be divided into a plurality of channels using any mechanism now known or later developed, including code division multiplexing, time division multiplexing, and/or frequency division multiplexing for instance.

For purposes of illustration only, the embodiments herein will be described by way of example with the wireless links carrying communications according to an IS-2000 protocol (also known as 1xRTT). According to IS-2000, each wireless link may be identified by its carrier frequency and a unique pseudonoise offset ("PN offset") that distinguishes the wireless link from other wireless links provided by access network 12. Each IS-2000 wireless link may include a forward link that is code division multiplexed via Walsh codes into various forward channels for carrying communications from access network 12 to one or more access terminals, such as a forward pilot channel, a forward sync channel, forward control channels (e.g., one or more forward paging channels, one or more forward common control channels, and/or a forward broadcast control channel), and one or more forward traffic channels (e.g., each of which may include a forward power control sub-channel). Similarly, each IS-2000 wireless link may include a reverse link that is code division multiplexed via Walsh codes into various reverse channels for carrying communications from one or more access terminals to access network 12, such as one or more reverse access channels, one or more reverse pilot channels (e.g., each of which may include a reverse power control sub-channel), and one or more reverse traffic channels.

According to IS-2000, access network 12 and any of access terminals 14a-d may be capable of entering a "soft-handoff state" during which they engage in a given communication session on multiple wireless links (defining the access terminal's "active set"). For instance, while in a soft-handoff state, access network 12 and access terminal 14a may have forward and reverse traffic channels established on two or more of wireless links $WL_1$-$WL_4$, such as wireless links $WL_1$, $WL_2$, and $WL_4$. In that case, access network 12 may send forward-bearer data for the given communication session on a respective forward link of each of wireless links $WL_1$, $WL_2$, and $WL_4$, and access terminal 14a may send reverse-bearer data for the given communication session on a respective reverse link of each of wireless links $WL_1$, $WL_2$, and $WL_4$. This ability to engage in a given communication session concurrently on multiple wireless links may enable access network 12 and access terminal 14a to remain connected over at least one wireless link at all times, which may result in a more seamless communication session as access terminal 14a moves through the access network's defined coverage areas. Further, this ability to engage in a given communication session concurrently on multiple wireless links may enable access network 12 and access terminal 14a to send and receive redundant data on multiple wireless links, which may result in a more reliable communication session. Other benefits may exist as well.

Referring again to FIG. 1, access network 12 may also include at least one base station controller (BSC), such as BSC 22, to which each BTS couples. (Although FIG. 1 depicts access network 12 as including one BSC, it should be understood that access network 12 may include more than one BSC, in which case each BSC may couple to a subset of the BTSs in access network 12. Further, although BSC 22 is depicted as separate entity from BTSs 20a-b, it should be understood that BSC 22 may be integrated together in whole or in part with one or both of BTSs 20a-b. Further yet, BSC 22 and one or both of BTSs 20a-b may together be referred to as a "base station.") BSC 22 may control aspects of BTSs 20a-b as well as aspects of wireless communication with access terminals 14a-d, such as aspects of connection establishment, handoff, and/or power control for instance. BSC 22 may perform other functions as well.

Further, access network 12 may include at least one mobile switching center (MSC), such as MSC 24, to which BSC 22 couples. (Although FIG. 1 depicts access network 12 as including one MSC, it should be understood that access network 12 may include more than one MSC, in which case each MSC may couple to a subset of the BSCs in access network 12.) As shown, MSC 24 may provide connectivity with circuit-switched network 16. Further, MSC 24 may control aspects of BTSs 20a-b and/or BSC 22 as well as aspects of wireless communication with access terminals 14a-d, such as aspects of connection establishment, handoff, and/or power control for instance. MSC 24 may perform other functions as well.

Further yet, access network 12 may include at least one packet data serving node (PDSN), such as PDSN 26, to which BSC 22 couples. (Although FIG. 1 depicts access network 12 as including one PDSN, it should be understood that access network 12 may include more than one PDSN, in which case each PDSN may couple to a subset of the BSCs in access network 12.) As shown, PDSN 26 may provide connectivity with packet-switched network 16. PSDN 26 may perform other functions as well.

Although not shown, access network 12 may also include and/or have access to various other entities. For example, access network 12 may include or have access to a home location register (HLR) and/or a visitor location register (VLR) that maintains profile data for subscribers and/or access terminals in access network 12, such as account information, preferences, and/or a last-known location for instance. Other examples are possible as well.

Each of access terminals 14a-d may be any device configured to receive wireless service from access network 12. By way of example only, each of access terminals 14a-d may take the form of a cellular telephone, a computer (e.g., a desktop, laptop, tablet, netbook, etc.), a personal digital assistant (PDA), or a personal navigation device (PND). Other examples are possible as well.

II. Current PCC Transmission Scheme a. Single-Link Communications

In the example communication system 10 depicted in FIG. 1, access network 12 and one of access terminals 14a-d, such as access terminal 14a, may begin engaging in a given communication session on a single wireless link, such as wireless link $WL_1$. For instance, access network 12 and access terminal 14a may first establish a forward traffic channel and a reverse traffic channel on wireless link $WL_1$. In turn, access network 12 may begin to send forward-bearer data for the given communication session at an initial forward transmission power value (e.g., 2.2 watts) on the established forward channel of wireless link $WL_1$. Similarly, access terminal 14a may begin to send reverse-bearer data for the given communication session at an initial reverse transmission power value (e.g., 0 dBm) on the established reverse channel of wireless link $WL_1$.

As noted above, while access network 12 and access terminal 14a are engaging in the given communication session on wireless link $WL_1$, access network 12 and access terminal 14a may also engage in a default power-control process to control the transmission power for the given communication session on wireless link $WL_1$. In particular, access network 12 and access terminal 14a may engage in a reverse default power-control process to control the reverse transmission power at which access terminal 14a sends bearer data for the given communication session on the established reverse traffic channel of wireless link $WL_1$ (i.e., the reverse traffic power for the given communication session). Similarly, access terminal 14a and access network 12 may engage in a forward default power-control process to control the forward transmission power at which access network 12 sends bearer data for the given communication session on the established forward traffic channel of wireless link $WL_1$ (i.e., the forward traffic power for the given communication session). These default power-control processes may take various forms.

i. Example Reverse Default Power-Control

According to an example reverse default power-control process, access network 12 may regularly determine a quality at which the established reverse traffic channel of wireless link $WL_1$ is carrying the given communication session (i.e., a reverse-channel quality). Access network 12 may then regularly compare the determined reverse-channel quality to a threshold reverse-channel quality and thereby decide whether to send a "power up" PCC that instructs access terminal 14a to increase its reverse traffic power for the given communication session on wireless link $WL_1$ or a "power down" PCC that instructs access terminal 14a to decrease its reverse traffic power for the given communication session on wireless link $WL_1$. For instance, based on each comparison, access network 12 may decide to send (a) a "power up" PCC directed to access terminal 14a if the determined reverse-channel quality is less than the threshold reverse-channel quality (which indicates that access network 12 is detecting a lower reverse-channel quality) or (b) a "power down" PCC directed to access terminal 14a if the measured reverse-channel quality is greater than the threshold reverse-channel quality (which indicates that access network 12 is detecting a higher reverse-channel quality). Accordingly, access network 12 may send a series of PCCs directed to access terminal 14a on wireless link $WL_1$.

As access network 12 sends the series of PCCs directed to access terminal 14a on wireless link $WL_1$, access terminal 14a may receive the series of PCCs from access network 12 on wireless link $WL_1$. (As noted above, however, that access terminal 14a may fail to receive some PCCs sent by access network 12 due to poor forward-channel quality or other factors.) In response to each PCC received from access network 12 on wireless link $WL_1$, access terminal 14a may then responsively adjust its reverse traffic power on wireless link $WL_1$ in accordance with the PCC. For instance, access terminal 14a may increase its reverse traffic power on wireless link $WL_1$ in response to receiving a "power up" PCC from access network 12 and decrease its reverse traffic power on wireless link $WL_1$ in response to receiving a "power down" PCC from access network 12. Accordingly, during this reverse default power-control process, access terminal 14a may continually adjust its reverse traffic power for the given communication session on wireless link $WL_1$.

ii. Example Forward Default Power-Control

According to an example forward default power-control process, access terminal 14a may regularly determine a quality at which the established forward traffic channel of wireless link $WL_1$ is carrying the given communication session (i.e., a forward-channel quality). Access terminal 14a may then regularly compare the determined forward-channel quality to a threshold forward-channel quality and thereby decide whether to send a "power up" PCC that instructs access network 12 to increase its forward traffic power on wireless link $WL_1$ or a "power down" PCC that instructs access network 12 to decrease its forward traffic power on wireless link $WL_1$. For instance, based on each comparison, access terminal 14a may decide to send (a) a "power up" PCC directed to access network 12 if the determined forward-channel quality is less than the threshold forward-channel quality (which indicates that access terminal 14a is detecting a lower forward-channel quality) or (b) a "power down" PCC directed to access network 12 if the measured forward-channel quality is greater than the threshold forward-channel quality (which indicates that access terminal 14a is detecting a higher forward-channel quality). Accordingly, access terminal 14a may send a series of PCCs directed to access network 12 on wireless link $WL_1$.

As access terminal 14a sends the series of PCCs directed to access network 12 on wireless link $WL_1$, access network 12 may receive the series of PCCs from access terminal 14a on wireless link $WL_1$. (Likewise, however, access network 12 may fail to receive some PCCs sent by access terminal 14 due to poor reverse-channel quality or other factors.) In response to each PCC received from access terminal 14a on wireless link $WL_1$, access network 12 may then responsively adjust its forward traffic power for the given communication session on wireless link $WL_1$ in accordance with the PCC. For instance, access network 12 may increase its forward traffic power for the given communication session on wireless link $WL_1$ in response to receiving a "power up" PCC from access terminal 14a and decrease its forward traffic power on wireless link $WL_1$ for the given communication session in response to receiving a "power down" PCC from access terminal 14a. Accordingly, during this forward default power-control process, access network 12 may continually adjust its forward traffic power for the given communication session on wireless link $WL_1$.

iii. Default PCC Transmission Power and Time Schedule

While engaging in the default power-control processes described above, access network 12 and access terminal 14a may send PCC data on wireless link $WL_1$ at a baseline power level that is equal to the power level at which access network 12 and access terminal 14a send bearer data for the given communication session on wireless link $WL_1$. For instance, the forward power at which access network 12 sends PCCs directed to access terminal 14a on the established forward channel of wireless link $WL_1$ (i.e., the baseline forward PCC power level) may be equal to the access network's forward traffic power for the given communication session on wireless link $WL_1$, which varies depending on the PCCs received from access terminal 14a on wireless link $WL_1$. Similarly, the reverse power at which access terminal 14a sends PCCs directed to access network 12 on wireless link $WL_1$ (i.e., the baseline reverse PCC power level) may be equal to the access terminal's reverse traffic power for the given communication session on wireless link $WL_1$, which varies depending on the PCCs received from access network 12 on wireless link $WL_1$. Other examples are possible as well, including the possibility that access network 12 and access terminal 14a send PCC data on wireless link $WL_1$ at a power level that is increased relative to the power level at which access network 12 and access terminal 14a send bearer data for the given communication session on wireless link $WL_1$.

While engaging in the default power-control processes described above, access network 12 and access terminal 14a may also send PCC data according to a predefined time schedule. For instance, access network 12 may send PCCs directed to access terminal 14a on wireless link $WL_1$ according to a common reference clock and a predefined transmission rate (e.g., 800 PCCs/second). Other examples are possible as well.

b. Multiple-Link Communications

At some point during the given communication session (if not at the start of the session), access network 12 and access terminal 14a may also enter a soft-handoff state and begin engaging in the given communication session on multiple wireless links, such as wireless links $WL_1$, $WL_2$, and $WL_4$. For instance, access network 12 and access terminal 14a may establish additional forward and reverse traffic channels on each of wireless links $WL_2$ and $WL_4$. In turn, access network 12 may continue to send the forward-bearer data for the given communication session at the forward traffic power on wireless link $WL_1$ (which varies depending on the PCCs received from access terminal 14a on wireless link $WL_1$) and begin to send the forward-bearer data for the given communication session at an initial forward traffic power value (e.g., 2.2 watts) on each of wireless links $WL_2$ and $WL_4$. Similarly, access terminal 14a may continue to send reverse-bearer data for the given communication session at the reverse traffic power on wireless link $WL_1$ (which varies depending on the PCCs received from access network 12 on wireless link $WL_1$) and begin to send the reverse-bearer data for the given communication session at an initial reverse traffic power value (e.g., 0 dBm) on each of wireless links $WL_2$ and $WL_4$.

While access network 12 and access terminal 14a are engaging in the given communication session on wireless links $WL_1$, $WL_2$, and $WL_4$, access network 12 and access terminal 14a may also engage in a soft-handoff power-control process to control transmission power for the given communication session on each of wireless links $WL_1$, $WL_2$, and $WL_4$. In particular, access network 12 and access terminal 14a may engage in a reverse soft-handoff power-control process to control the access terminal's respective reverse traffic power for the given communication session on each of wireless links $WL_1$, $WL_2$, and $WL_4$. Similarly, access terminal 14a and access network 12 may engage in a forward soft-handoff power-control process to control the access network's respective forward traffic power for the given communication session on each of wireless links $WL_1$, $WL_2$, and $WL_4$. These soft-handoff power-control processes may take various forms.

i. Example Reverse Power-Control

According to an example reverse soft-handoff power-control process, while engaging in the given communication session on wireless links $WL_1$, $WL_2$, and $WL_4$, access network 12 may regularly determine a respective reverse-channel quality at which each of wireless links $WL_1$, $WL_2$, and $WL_4$ is carrying the given communication session. For each of wireless links $WL_1$, $WL_2$, and $WL_4$, access network 12 may then regularly compare the determined reverse-channel quality to a threshold reverse-channel quality and thereby decide whether to send a "power up" PCC that instructs access terminal 14a to increase its reverse traffic power for the given communication session on the wireless link or a "power down" PCC that instructs access terminal 14a to decrease its reverse traffic power for the given communication session on the wireless link. Accordingly, access network 12 may concurrently send a respective series of PCCs directed to access terminal 14a on each of wireless links $WL_1$, $WL_2$, and $WL_4$.

As access network 12 concurrently sends the respective series of PCCs directed to access terminal 14a on each of wireless links $WL_1$, $WL_2$, and $WL_4$, access terminal 14a may receive the respective series of PCCs concurrently on each of wireless links $WL_1$, $WL_2$, and $WL_4$. As noted above, however, access terminal 14a may fail to receive some PCCs sent by access network 12 due to poor forward-link quality or other factors.

As access terminal 14a concurrently receives the respective series of PCCs sent by access network 12 on each of wireless links $WL_1$, $WL_2$, and $WL_4$, access terminal 14a may adjust its respective reverse traffic power for the given communication session on all of wireless links $WL_1$, $WL_2$, and $WL_4$ in a coordinated manner. For instance, access terminal 14a may increase its respective reverse traffic power on all of wireless links $WL_1$, $WL_2$, and $WL_4$ in response to receiving a "power up" PCC from access network 12 concurrently on all of wireless links $WL_1$, $WL_2$, and $WL_4$ (which indicates that access network 12 is detecting a lower reverse-channel quality on all of wireless links $WL_1$, $WL_2$, and $WL_4$). And access terminal 14a may decrease its respective reverse traffic power on all of wireless links $WL_1$, $WL_2$, and $WL_4$ in response to receiving a "power down" PCC from access network 12 on any of wireless links $WL_1$, $WL_2$, and $WL_4$ (which indicates that access network 12 is detecting a higher reverse-channel quality on at least one of wireless links $WL_1$, $WL_2$, and $WL_4$). Other examples are possible as well.

Accordingly, during this reverse soft-handoff power-control process, access terminal 14a may continually adjust its respective reverse traffic power for the given communication session on each of wireless links $WL_1$, $WL_2$, and $WL_4$.

ii. Example Forward Power-Control

According to an example forward soft-handoff power-control process, while engaging in the given communication session on wireless links $WL_1$, $WL_2$, and $WL_4$, access terminal 14a may regularly determine a respective forward-channel quality at which each of wireless links $WL_1$, $WL_2$, and $WL_4$ is carrying the given communication session. For each of wireless links $WL_1$, $WL_2$, and $WL_4$, access terminal 14a may regularly compare the determined forward-channel quality to a threshold forward-channel quality and thereby decide whether to send a "power up" PCC that instructs access network 12 to increase its forward traffic power for the given communication session on the wireless link or a "power down" PCC that instructs access network 12 to decrease its forward traffic power for the given communication session on the wireless link. Accordingly, access terminal 14a may concurrently send a respective series of PCCs directed to access network 12 on each of wireless links $WL_1$, $WL_2$, and $WL_4$.

As access terminal 14a concurrently sends the respective series of PCCs directed to access network 12 on each of wireless links $WL_1$, $WL_2$, and $WL_4$, access network 12 may receive the respective series of PCCs concurrently on each of wireless links $WL_1$, $WL_2$, and $WL_4$. As noted above, however, access network 12 may fail to receive some PCCs sent by access terminal 14a due to poor reverse-link quality or other factors.

As access network 12 concurrently receives the respective series of PCCs sent by access terminal 14a on each of wireless links $WL_1$, $WL_2$, and $WL_4$, access network 12 may also adjust its respective forward traffic power for the given communication session on each of wireless links $WL_1$, $WL_2$, and $WL_4$ in a coordinated manner. For instance, access network 12 may increase its respective forward traffic power on all of wireless links $WL_1$, $WL_2$, and $WL_4$ in response to receiving a "power up" PCC from access terminal 14a concurrently on all of wireless links $WL_1$, $WL_2$, and $WL_4$ (which indicates that access terminal 14 is detecting a lower forward-channel quality on all of wireless links $WL_1$, $WL_2$, and $WL_4$). And access network 12 may decrease its respective forward traffic power on all of wireless links $WL_1$, $WL_2$, and $WL_4$ in response to receiving a "power down" PCC from access terminal 14a on any of wireless links $WL_1$, $WL_2$, and $WL_4$ (which indicates that access terminal 14 is detecting a higher forward-channel quality on at least one of wireless links $WL_1$, $WL_2$, and $WL_4$). Other examples are possible as well.

Accordingly, during this forward soft-handoff power-control process, access network 12 may continually adjust its respective forward traffic power for the given communication session on each of wireless links $WL_1$, $WL_2$, and $WL_4$.

iii. Soft-Handoff PCC Transmission Power and Time Schedule

In certain protocols such as IS-2000, after beginning to engage in the soft-handoff power-control processes described above, access network 12 and access terminal 14a may each be configured to increase the respective power level at which to send PCCs on each of the multiple wireless links by a predefined offset that correlates to the number of wireless links carrying the communication session (e.g., 2 dB for 2 wireless links, 3 dB for 3 wireless links, etc.). For instance, after beginning to engage in the after beginning to engage in soft-handoff power-control processes on wireless links $WL_1$, $WL_2$, and $WL_4$, the access network's respective forward PCC power for each of wireless links $WL_1$, $WL_2$, and $WL_4$ may be a predefined offset higher (e.g., 3 dB) than the access network's respective forward traffic power for the given communication session on each of wireless links $WL_1$, $WL_2$, and $WL_4$. Similarly, the access terminal's respective reverse PCC power for each of wireless links $WL_1$, $WL_2$, and $WL_4$ may be a predefined offset (e.g., 3 dB) higher than the access terminal's respective reverse traffic power for the given communication session on each of wireless links $WL_1$, $WL_2$, and $WL_4$.

While engaging in the soft-handoff power-control processes described above, access network 12 and access terminal 14a may also continue to send PCC data according to a predefined time schedule. For instance, access network 12 may send PCCs directed to access terminal 14a on each of wireless links $WL_1$, $WL_2$, and $WL_4$ according to a common reference clock and a predefined transmission rate (e.g., 800 PCCs/second). Other examples are possible as well.

c. Impact of Increased-Power PCCs

By sending PCCs at an increased power level relative to the traffic power level in certain circumstances (e.g., during soft handoff as described above), access network 12 may reduce the likelihood of the access terminal 14a failing to receive PCCs and thereby improve the overall effectiveness of the power-control process. However, the increased power level at which access network 12 sends these PCCs may, in some instances, have negative effects on the performance of access network 12 as a whole.

As described above, one such negative effect is an increase in the power utilization on a given wireless link (i.e., a total amount of power used on the wireless link divided by a maximum allowable power of the wireless link). Typically, access network 12 engages in active communication with, and thus sends respective series of PCCs directed to, several different active access terminals on a given wireless link, such as access terminals 14a-d on wireless link $WL_1$. And typically, access network 12 sends the respective series of PCCs directed to each of access terminals 14a-d on wireless link $WL_1$ according to the same time schedule (e.g., the same reference clock and the same rate), in which case access network 12 periodically makes a simultaneous transmission of a respective PCC directed to each of access terminals 14a-d on wireless link $WL_1$. Thus, when access network 12 increases the power level at which to send PCCs directed to one or more of access terminals 14a-d on wireless link $WL_1$ within this configuration (e.g., according to the example mechanism described above), the access network's periodic, simultaneous PCC transmissions may cause "spikes" in the power utilization on wireless link $WL_1$. This impact of increased-power PCCs on power utilization is illustrated with reference FIGS. 2 and 3.

Figure 2:
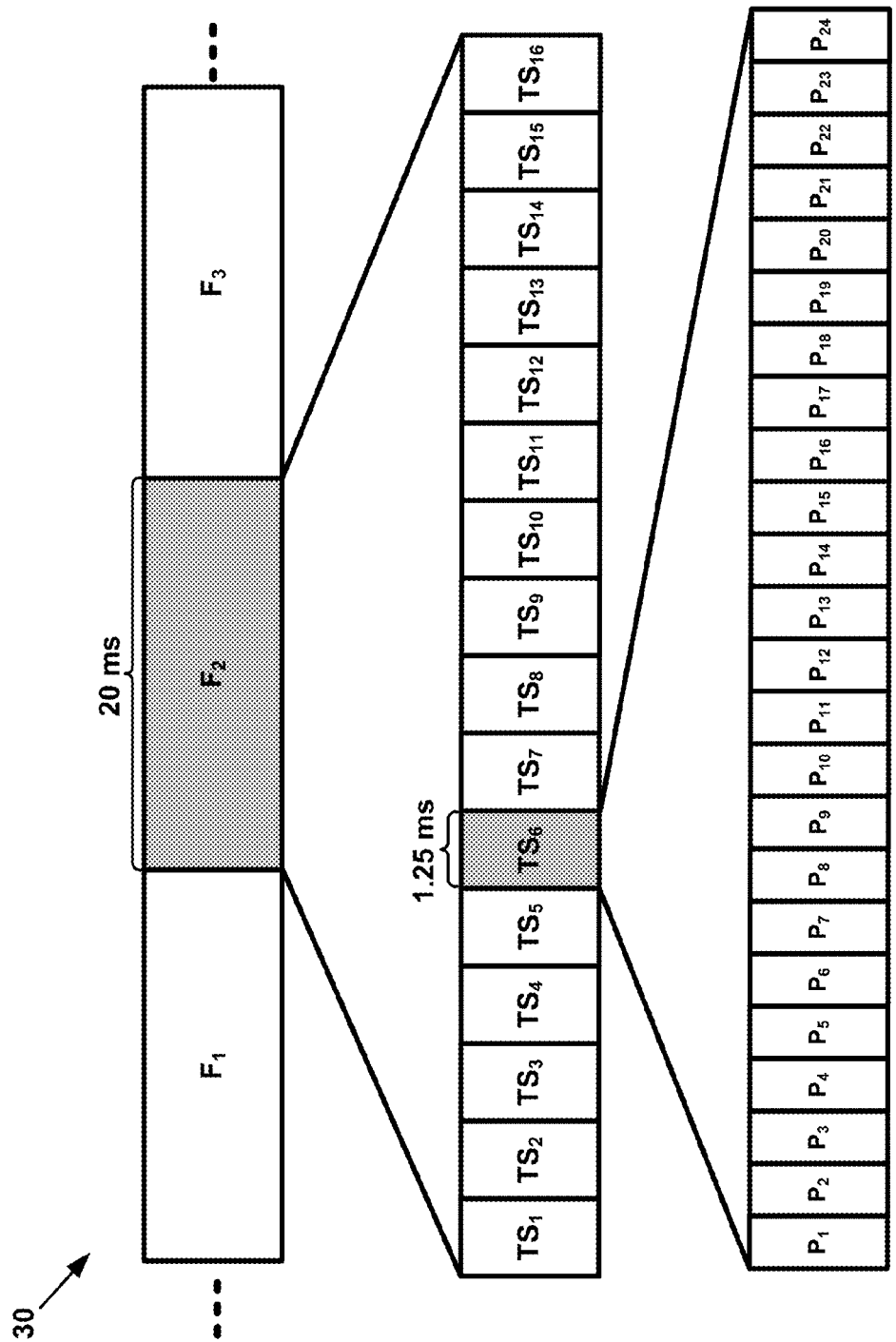
FIG. 2 depicts an example forward-link channel of a wireless link.

FIG. 2 depicts an example arrangement of forward-link traffic channel data 30 transmitted by access network 12 to access terminal 14a on a given wireless link, such as wireless link $WL_1$. As shown in FIG. 2, forward-link traffic channel data 30 may be arranged into a series of data frames each having a given duration, such as frames $F_1$-$F_3$ each having a duration of 20 milliseconds (ms). Further, as shown, each such frame may be arranged into a series of timeslots each having a given duration, such as timeslots $TS_1$-$TS_{16}$ each having a duration of 1.25 ms. Further yet, as shown, each such timeslot may include a given number of positions in which to send a respective data bit (e.g., a bearer data bit or PCC data bit), such as positions $P_1$-$P_{24}$. Forward-link traffic channel data 30 may take other forms as well.

Figure 3:
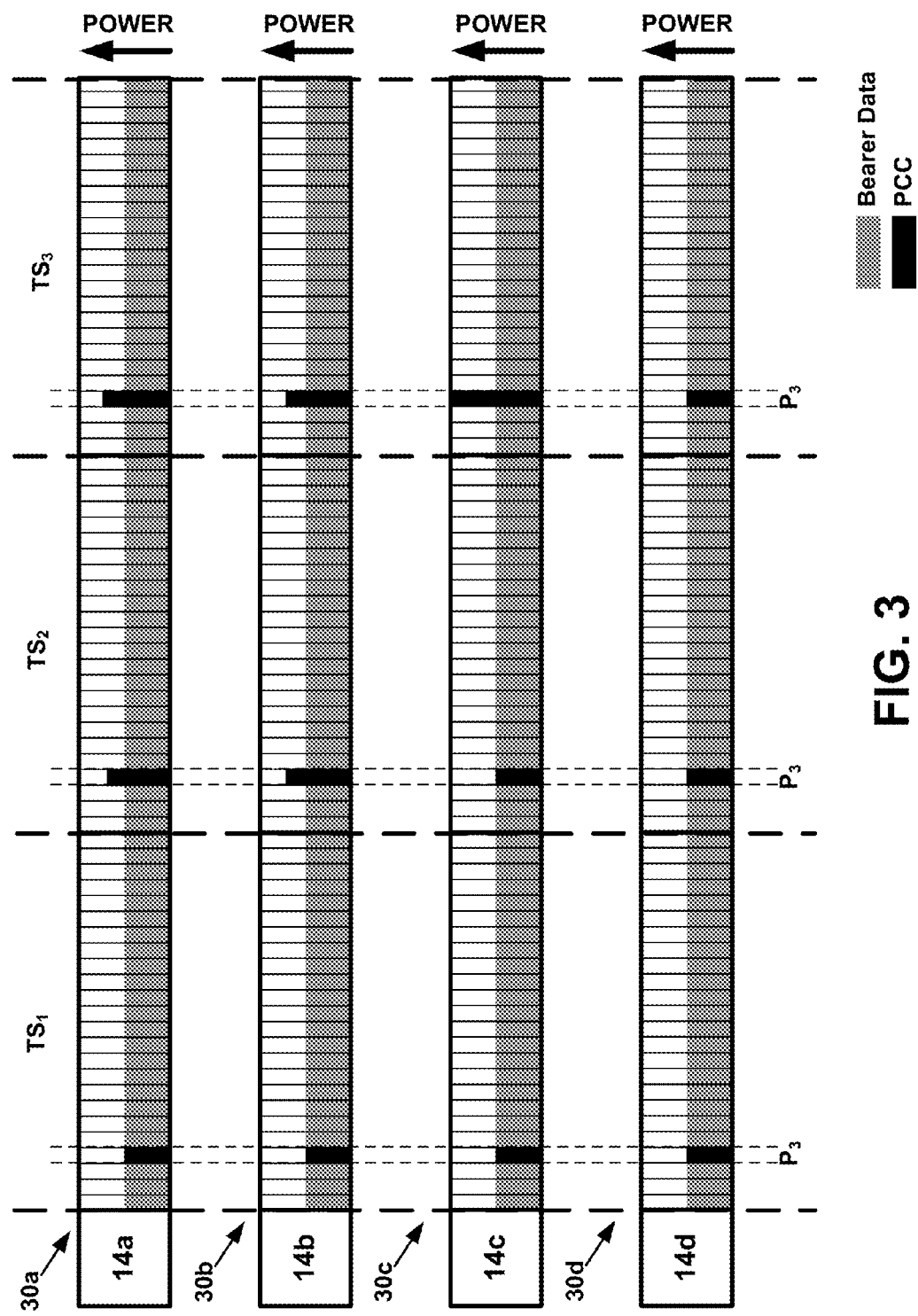
FIG. 3 depicts an example timeline of transmission power levels for respective data streams sent from an access network to a plurality of access terminals on respective forward-traffic channels of a wireless link, according to an example PCC transmission scheme.

FIG. 3 is a timeline illustrating a portion of a respective forward-link traffic channel transmission 30a-30d from access network 12 to each of access terminals 14a-d on wireless link $WL_1$, in accordance with the example PCC transmission scheme described above. In particular, FIG. 3 depicts the access network's transmission of a respective series of PCCs directed to each of access terminals 14a-d on wireless link $WL_1$ in the context of three timeslots $TS_1$-$TS_3$ of respective forward-link traffic channel transmissions 30a-30d. For purposes of illustration, FIG. 3 depicts the transmission power of bearer data (i.e., forward traffic power) in gray and the transmission power of PCC data (i.e., the forward PCC power) in black. Further, for purposes of illustration only, FIG. 3 depicts respective transmission power levels for each respective forward-traffic channel data transmission 30a-30b to be constant and substantially similar. It should be understood, however, that the transmission power levels for the respective forward-traffic channel data transmissions 30a-30b on wireless link $WL_1$ may be varying continually based on the PCCs sent by the respective access terminals 14a-d.

As shown in FIG. 3, in accordance with the example PCC transmission scheme described above, access network 12 may send respective series of PCCs directed to the access terminals 14a-d according to the same time schedule. For instance, access network 12 may send the respective forward-traffic channel data transmissions 30a-30b according to a common reference clock, such that the frame (and timeslot) borders of the transmissions are aligned. In turn, access network 12 may then send a respective PCC directed to each of access terminals 14a-d in a common predefined position of each respective timeslot of each data frame. As a result, access network 12 may periodically make a simultaneous transmission of a respective PCC directed to each of access terminals 14a-d.

The transmissions in FIG. 3 may begin with access network 12 engaging in a respective single-link communication session with each of access terminals 14a-d, in which case access network 12 is sending both bearer data and PCC data directed to each of access terminals 14a-d at a first power level. In timeslot $TS_1$ of each of respective forward-traffic channel data transmissions 30a-30b, access network 12 may then make a first simultaneous transmission of a first respective PCC bit to each of access terminals 14a-d in the common predefined timeslot position (e.g., position $P_3$), while transmitting bearer data bits in all other timeslot positions. Given that access network 12 sends each respective first PCC at the first power level, however, this PCC transmission will not increase power utilization on wireless link $WL_1$.

Sometime before a timeslot $TS_2$, access network 12 may then begin engaging in the respective communication session with each of access terminals 14a-b over two wireless links. In response, access network 12 may increase the power level at which to transmit PCCs directed to each of access terminals 14a-b by a predetermined offset that correlates to the number of wireless links carrying each respective communication session (in this case two).

In timeslot $TS_2$ of each of respective forward-traffic channel data transmissions 30a-30d, access network 12 may then make a second simultaneous transmission of a second respective PCC directed to each of access terminals 14a-d in the common predefined timeslot position (e.g., position $P_3$), while sending bearer data bits in all other timeslot positions. During this second simultaneous PCC transmission, access network 12 may send the second respective PCC to each of access terminals 14a-b at a second power level (because these access terminals are communicating over two links) and the second respective PCC to each of access terminals 14c-d at the first power level. As a result, the access network's second simultaneous PCC transmission—which includes the transmission of increased-power PCCs directed to access terminals 14a-b—may cause a temporary "spike" in the power utilization of wireless link $WL_1$.

Sometime before a timeslot $TS_3$, access network 12 may then begin engaging in the respective communication with access terminal 14c over three wireless links. In response, access network 12 may increase the power level at which to transmit PCCs directed to access terminal 14c by a predetermined offset that correlates to the number of wireless links carrying each respective communication session (in this case three).

In timeslot $TS_3$ of each of respective forward-traffic channel data transmissions 30a-30d, access network 12 may then make a third simultaneous transmission of a third respective PCC directed to each of access terminals 14a-d in the common predefined timeslot position (e.g., position $P_3$), while sending bearer data bits in all other timeslot positions. During this third simultaneous PCC transmission, access network 12 may send the third respective PCC to each of access terminals 14a-b at the second power level (because these access terminals are communicating over two links), the third respective PCC to access terminal 14c at the third power level (because this access terminal is communicating over three links), and the third respective PCC to access terminal 14d at the first power level. As a result, the access network's third simultaneous PCC transmission—which includes the transmission of increased-power PCCs directed to access terminals 14a-c—may cause another temporary "spike" in the power utilization of wireless link $WL_1$ that is increased relative to the spike during timeslot $TS_2$.

As the magnitude of these temporary spikes continues to increase (e.g., due to an increase in multi-link communications on wireless link $WL_1$), the overall power utilization of wireless link $WL_1$ may correspondingly increase. If this overall power utilization ultimately rises above a threshold level (e.g., 80%), access network 12 may then begin "power blocking" any new communications on wireless link $WL_1$ until the overall power utilization falls back below the threshold level, thereby negatively affecting the performance of the access network as a whole.

For at least this reason, a more intelligent PCC transmission scheme that reduces the occurrence of spikes in the power utilization of wireless link $WL_1$ is desirable. Such a PCC transmission scheme would be particularly beneficial in circumstances where access network 12 is sending increased-power PCCs directed to several access terminals 14a-d on wireless link $WL_1$ as described above, but may be applicable in other circumstances as well.

III. Exemplary PCC Transmission Scheme

Figure 4:
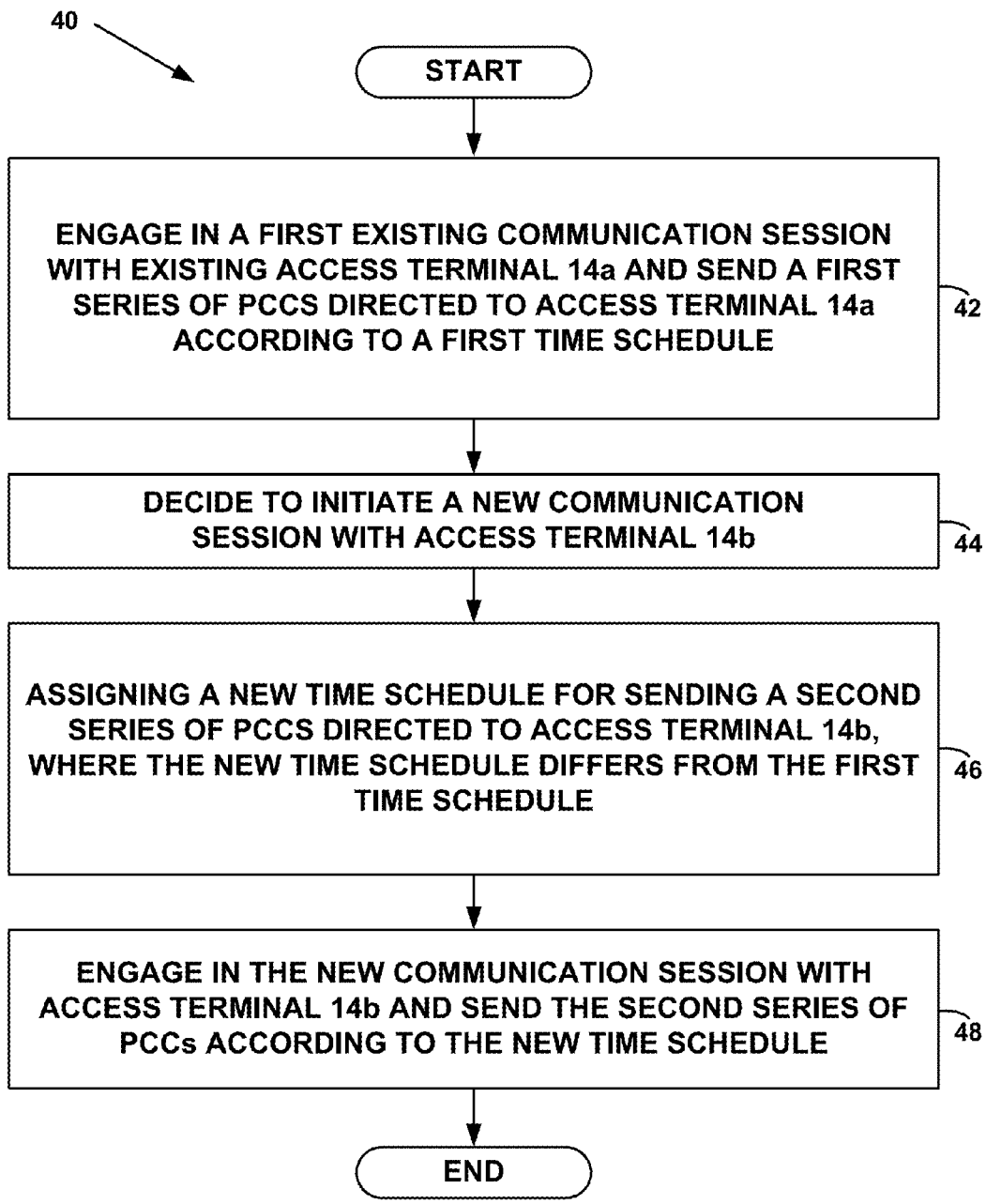
FIG. 4 is a simplified flow chart depicting an example embodiment of the disclosed PCC transmission scheme.

FIG. 4 is a simplified flow chart depicting an example embodiment 40 of the disclosed PCC transmission scheme. For purposes of illustration, example embodiment 40 will be described with reference to access network 12 sending PCCs directed to a plurality of access terminals on a given wireless link, such as access terminals 14a-d on wireless link $WL_1$. It should be understood, however, that example embodiment 40 may be applicable to any configuration in which a first entity is sending PCCs directed to a plurality of other entities on a single wireless link.

Example embodiment 40 begins at step 42 with access network 12 engaging in a respective existing communication session with at least one of access terminals 14a-d on wireless link $WL_1$. For instance, access network 12 may be sending a first series of data frames directed to access terminal 14a on wireless link $WL_1$ according to a first reference clock. These frames may take various forms, including those described above with reference to FIG. 2. Other examples are possible as well. Additionally, access network 12 may be sending a first series of PCCs according to a first time schedule, such as by sending a respective PCC in a first position of each respective timeslot in the first series of data frames. Other examples are possible as well.

At step 44, access network 12 may decide to initiate a new communication session with a new access terminal. In response, at step 46, access network 12 may assign a new time schedule for sending a new series of PCCs directed to the new access terminal, where the new time schedule differs from at least one respective existing time schedule for sending a respective existing series of PCCs directed to a respective access terminal. For instance, access network 12 may decide to initiate a second communication session with access terminal 14b and then responsively assign a second time schedule for sending a second series of PCCs directed to access terminal 14b, where the second time schedule differs from at least the first time schedule for sending PCCs directed to access terminal 14a. Access network 12 may carry out this assignment according to various techniques, which may be implemented separately or together.

According to a first technique, access network 12 may first select a new reference clock for sending data directed to access terminal 14b that is substantially similar to the first reference clock for sending data directed to access terminal 14a, such that the frame (and timeslot) borders of the second communication session align with the frame (and timeslot) borders of the first communication session. In turn, access network 12 may select a new position for sending a respective PCC in each respective timeslot in the second communication session with access terminal 14b, where the new position differs from at least the first position for sending a respective PCC in each respective timeslot of the first communication session with access terminal 14a (and perhaps differs from any position being used for sending a respective series of PCCs to a respective existing access terminal).

Access network 12 may select the new position to be different than the first position in various manners. As one example, access network 12 may select the new position to be adjacent to the first position. As another example, access network 12 may select the new position to be a predefined number of positions away from the first position. As yet another example, access network 12 may select the new position from a set of unassigned positions, such that the new position is different from any other position being used for sending a respective series of PCCs to a respective existing access terminal (which may be possible as long as a number of existing communications sessions on wireless link $WL_1$ is less than the number of positions in each respective timeslot of such communication sessions). Access network 12 may select the new position to be different from the first position in other manners as well.

According to a second technique, access network 12 may first select a new reference clock for sending data directed to access terminal 14b that is different from at least the first reference clock for sending data directed to access terminal 14a (and perhaps differs from any reference clock being used for sending data to a respective existing access terminal). In turn, access network 12 may select a new position for sending a respective PCC in each respective timeslot in the second communication session with access terminal 14b, where the new position is the same as the first position for sending a respective PCC in each respective timeslot of the first communication session with access terminal 14a.

Access network 12 may select the new reference clock to be different than the first reference clock in various manners. As one example, access network 12 may select the new reference clock to be delayed by a predefined amount (e.g., the duration of a bit-position) relative to the first reference clock. As another example, access network 12 may select the new reference clock to be delayed by a given amount that is selected from a group of unassigned delay amounts, such that the new reference clock is different from any other reference clock being used for sending data to a respective existing access terminal (which may be possible as long as a number of existing communications sessions on wireless link $WL_1$ is less than the number of positions in each respective timeslot of such communication sessions). Access network 12 may select the new reference clock in other manners as well.

At step 48, access network 12 may begin engaging in the second communication session with access terminal 14b. This may involve sending the new series of PCCs according to the new time schedule. For instance, access network 12 may begin sending a second series of data frames directed to access terminal 14b on wireless link $WL_1$ according to the second reference clock. Additionally, access network 12 may begin sending the second series of PCCs according to the second time schedule, such as by sending a respective PCC in the selected position of each respective timeslot in the second series of data frames. Other examples are possible as well.

Access network 12 may carry out embodiment 40 regularly as it serves access terminals on wireless link $WL_1$. As a result, access network 12 may assign different time schedules for sending PCCs directed to different access terminals, so as to limit the simultaneous transmission of PCCs directed to multiple access terminals and thereby minimize the magnitude of spikes in power utilization on wireless link $WL_1$. The benefits of the disclosed PCC transmission scheme on power utilization are illustrated with reference to FIGS. 5 and 6.

Figure 5:
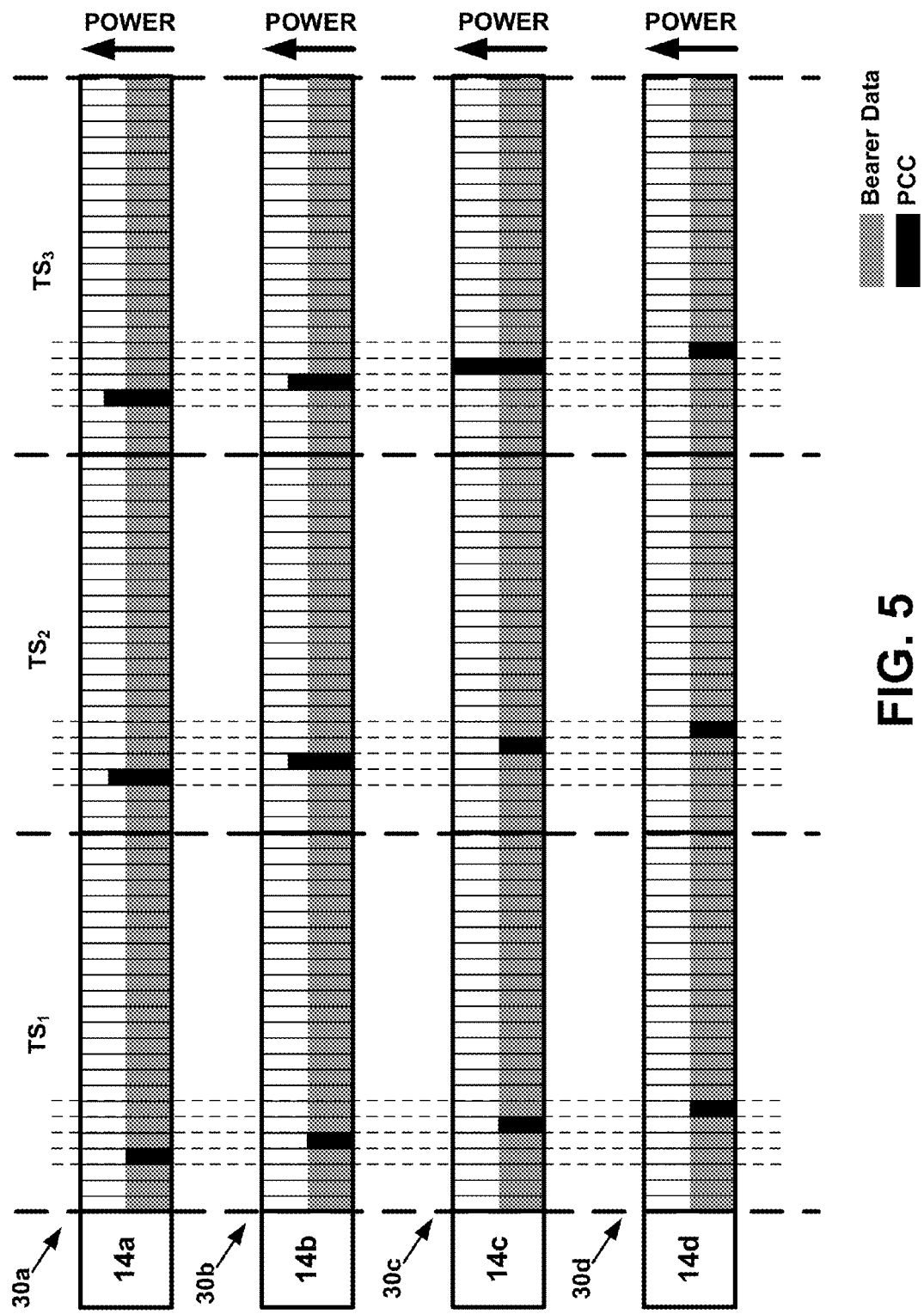
FIG. 5 depicts a timeline of baseline traffic and PCC power levels for respective communication sessions between an access network and a plurality of access terminals on a given forward-link channel of a wireless link, according to an embodiment of the disclosed PCC transmission scheme.

FIG. 5 is a timeline illustrating a portion of a respective forward-link traffic channel transmission 30a-30d from access network 12 to each of access terminals 14a-d on wireless link $WL_1$, in accordance with the disclosed PCC transmission scheme and the first technique for assigning a new time schedule for sending a new series of PCCs directed to a new access terminal. In particular, as shown in FIG. 5, access network 12 sends a respective series of frames to each of access terminals 14a-d according to a common reference clock. In turn, access network 12 sends a respective PCC directed to each of access terminals 14a-d in a different position of each respective timeslot of each data frame. As a result, access network 12 may avoid a simultaneous transmission of a respective PCC directed to each of access terminals 14a-d, thereby minimizing the magnitude of spikes in power utilization on wireless link $WL_1$ and reducing the likelihood of power blocking on wireless link $WL_1$.

Figure 6:
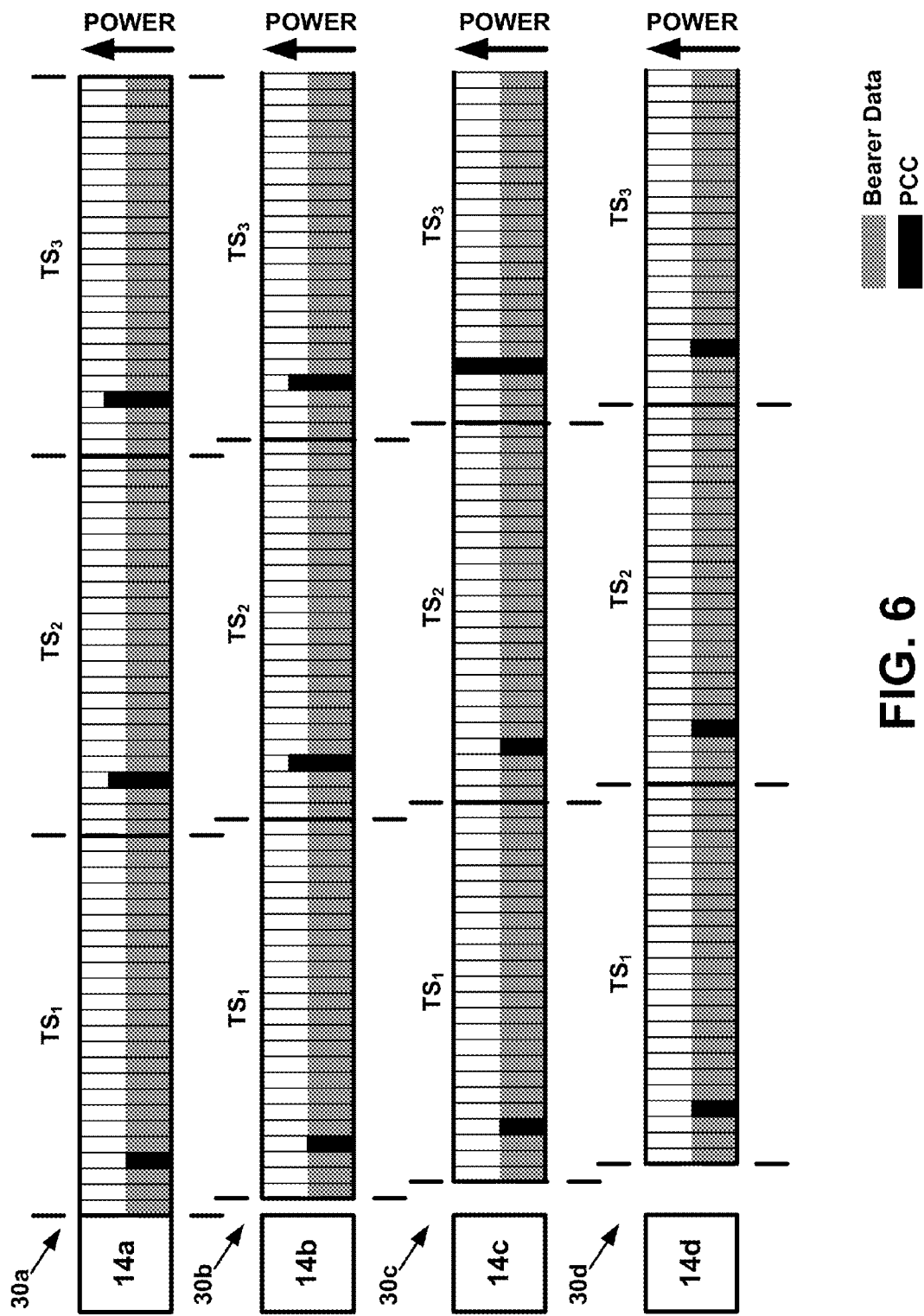
FIG. 6 depicts a timeline of baseline traffic and PCC power levels for respective communication sessions between an access network and a plurality of access terminals on a given forward-link channel of a wireless link, according to an embodiment of the disclosed PCC transmission scheme.

FIG. 6 is a timeline illustrating a portion of a respective forward-link traffic channel transmission 30a-30d from access network 12 to each of access terminals 14a-d on wireless link $WL_1$, in accordance with the disclosed PCC transmission scheme and the second technique for assigning a new time schedule for sending a new series of PCCs directed to a new access terminal. In particular, as shown in FIG. 5, access network 12 sends a respective series of frames to each of access terminals 14a-d according to a different respective reference clock. In turn, access network 12 sends a respective PCC directed to each of access terminals 14a-d in a common position of each respective timeslot of each data frame. As a result, access network 12 may avoid a simultaneous transmission of a respective PCC directed to each of access terminals 14a-d, thereby minimizing the magnitude of spikes in power utilization on wireless link $WL_1$ and reducing the likelihood of power blocking on wireless link $WL_1$.

IV. Exemplary Access Network Entity

Figure 7:
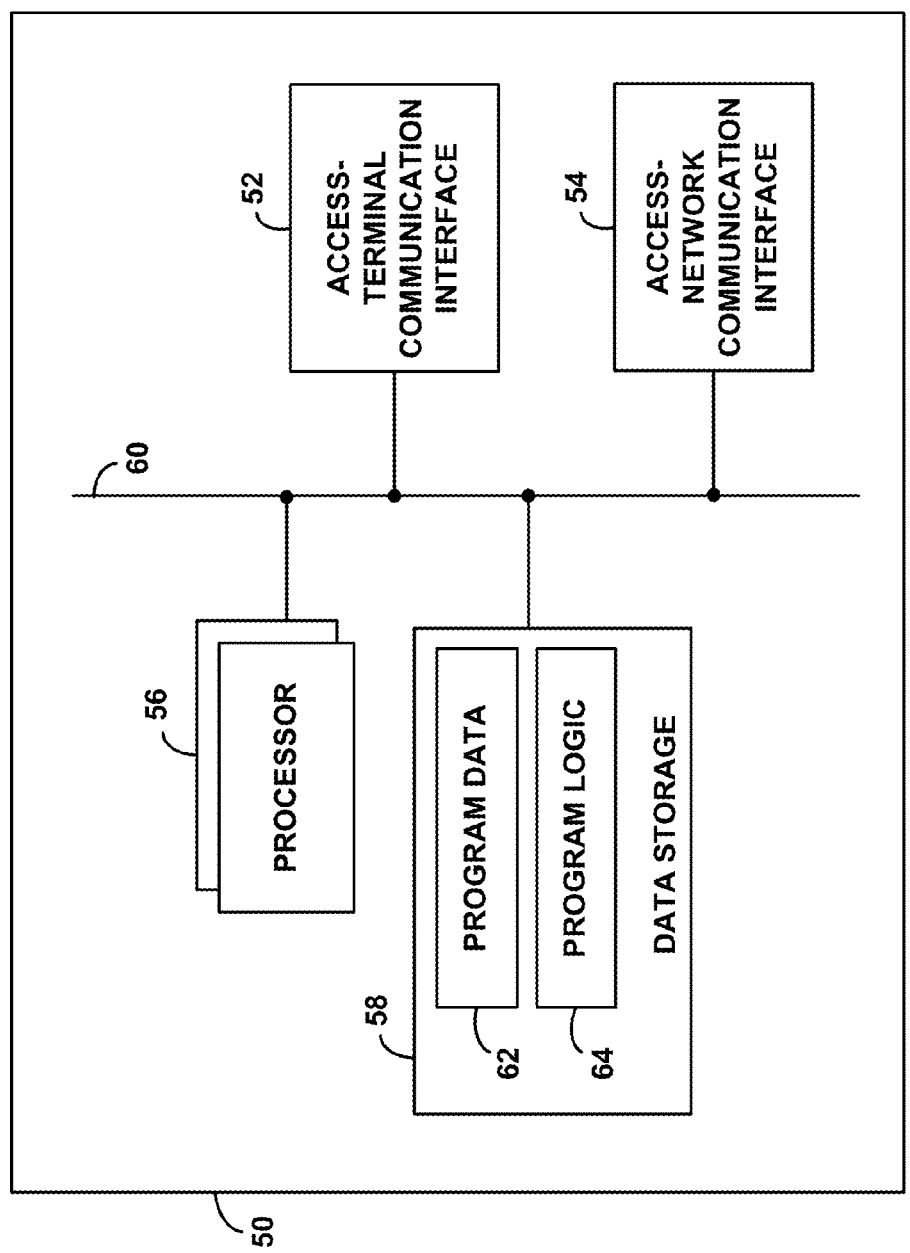
FIG. 7 is a simplified block diagram showing functional components of an exemplary access network entity capable of carrying out features of the disclosed PCC transmission scheme.

FIG. 7 is a simplified block diagram showing functional components of an exemplary access network entity capable of carrying out features of the disclosed PCC transmission scheme. The access network entity may be, for example, a base transceiver station (BTS) or any other access network entity in access network 12 capable carrying out features of the exemplary PCC transmission scheme. As shown in FIG. 7, exemplary access network entity 50 may include an access-terminal communication interface 52, an access-network communication interface 54, a processor 56, and data storage 58, all linked together via a system bus, network, or other connection mechanism 60. Access network entity 50 may include other components as well.

Referring to FIG. 7, access-terminal communication interface 52 may radiate to define one or more wireless coverage areas or sectors and provide one or more wireless links over which access terminals may communicate with access network entity 50. As such, access-terminal communication interface 52 may include one or more antenna structures arranged in various ways (e.g., one or more directional or sectored antennas). Additionally, access-terminal communication interface 52 may include at least one power amplifier for each provided wireless link. Each such power amplifier may enable access network entity 50 to adjust both its total transmission power on each forward link and its transmission power on each respective channel of each forward link. Each such power amplifier may also define practical limits on the maximum and minimum power levels at which access network entity 50 can transmit on each forward link and each respective channel of each forward link. In particular, one or more of these power amplifiers may define the maximum allowable power on a given wireless link, as used to determine the power utilization on the given wireless link. Other configurations are possible as well.

Access-network communication interface 54 may be configured to communicatively couple access network entity 50 to various other access network entities, such as one or more MSCs and/or one or more PDSNs for instance. To facilitate these couplings, access-network communication interface 54 may take various forms. For example, access-network communication interface 54 may take the form of an Ethernet interface, a serial bus interface (e.g., Firewire, USB 2.0, etc.), a chipset and antenna adapted to facilitate wireless communication according a desired protocol, and/or any other interface that provides for wired and/or wireless communication with an access network entity. Access-network communication interface 54 may also include some combination of different interfaces types. Other configurations are possible as well.

Processor 56 may comprise one or more processor components, such as general-purpose processors (e.g., a microprocessor), application-specific processors (e.g., an application-specific integrated circuit (ASIC) or digital signal processor (DSP)), programmable logic devices (e.g., a field programmable gate array (FPGA)), or other processor components now known or later developed. Data storage 58, in turn, may comprise one or more non-transitory computer-readable storage mediums, such as volatile data storage mediums (e.g., random access memory (RAM), registers, and/or cache) and/or non-volatile data storage mediums (e.g., read only memory (ROM), a hard disk drive, a solid state drive, flash memory, and/or an optical storage device). Some data storage mediums may be integrated in whole or in part with processor 56. Further, some data storage mediums may be external to and/or removable from access network entity 50 and may interface with access network entity 50 in various manners. As shown, data storage 58 may contain (i) program data 62 and (ii) program logic 64, which may be maintained either separately or together within data storage 58.

Program data 62 may contain information relating to wireless links over which access network entity 50 may communicate with access terminals. For example, program data 62 may contain an identifier of each such wireless link (e.g., a carrier frequency and a PN offset). As another example, program data 62 may contain identifiers of forward and/or reverse channels on each such wireless link (e.g., MAC IDs and/or Walsh codes). As still another example, program data 62 may contain data defining each coverage area served by each such wireless link (e.g., indications of the shape, size, and/or location of each coverage area). Other examples are possible as well.

Further, program data 62 may contain information relating to one or more access terminals being served by access network entity 62. For example, program data 82 may contain an identifier of each such access terminal. As another example, program data 62 may contain an identifier of a wireless link serving each such access terminal. As yet another example, program data 62 may contain identifiers of any forward and/or reverse channels established with each such access terminal (e.g., MAC IDs and/or Walsh codes). Other examples are possible as well.

Further yet, program data 62 may contain information relating to each active communication session between access network entity 50 and an active access terminal. For example, program data 62 may contain data defining each such active communication session, including identifiers of the access terminal, the access network entities, the wireless link(s), and/or the forward and reverse channel(s) involved in the active communication session. As another example, for each such active communication session, program data 62 may contain an indicator of a current transmission rate at which the access network is sending PCCs directed to the access terminal involved in the communication session. As yet another example, for each such active communication session, program data 62 may contain an indicator of a transmission-power adjustment instructed by PCCs directed to the access terminal involved in the communication session. Other examples are possible as well.

Program logic 64 may comprise machine-language instructions that may be executed or interpreted by processor 56 to carry out functions in accordance with exemplary method 40. For instance, program logic 64 may be executable by processor 56 to (a) engage in a respective existing communication session with each of a plurality of existing access terminals, wherein engaging in each such respective existing communication session comprises sending a respective existing series of PCCs directed to a respective existing access terminal according to a respective existing time schedule, (b) decide to initiate a new communication session with a new access terminal, (c) in response to the deciding, assign a new time schedule for sending a new series of PCCs directed to the new access terminal, wherein the new time schedule differs from at least one respective existing time schedule for sending a respective existing series of PCCs directed to a respective existing access terminal, and (d) engage in the new communication session with the new access terminal, wherein engaging in the new communication session comprises sending the new series of PCCs according to the new time schedule. Program logic 84 may be executable by processor 76 to carry out various other functions as well.

V. Conclusion

Exemplary embodiments have been described above. Those skilled in the art will understand, however, that changes and modifications may be made to the embodiments described without departing from the true scope and spirit of the present invention, which is defined by the claims.

We claim:

1. A method comprising:
an access network engaging in a first communication session with a first access terminal on a given wireless link, wherein engaging in the first communication session comprises sending a first series of power control commands (PCCs) directed to the first access terminal on the given wireless link according to a first time schedule;
the access network deciding to initiate a second communication session with a second access terminal on the given wireless link;
in response to the deciding, the access network assigning a second time schedule for sending a second series of PCCs directed to the second access terminal on the given wireless link in parallel with the first series of PCCs directed to the first access terminal, wherein the second time schedule differs from the first time schedule; and
the access network engaging in the second communication session with the second access terminal on the given wireless link, wherein engaging in the second communication session comprises sending the second series of PCCs on the given wireless link according to the second time schedule and in parallel with the first series of PCCs.

2. The method of claim 1, wherein:
engaging in the first communication session comprises sending a first series of frames according to a first reference clock, each frame in the first series of frames having a series of timeslots, and
engaging in the second communication session comprises sending a second series of frames according to a second reference clock, each frame in the second series of frames having a series of timeslots.

3. The method of claim 2, wherein:
sending the first series of PCCs according to the first time schedule comprises sending a respective PCC in a first position of each respective timeslot in the first series of frames, and
sending the second series of PCCs according to the second time schedule comprises sending a respective PCC in a second position of each respective timeslot in the second series of frames.

4. The method of claim 3, wherein assigning the second time schedule comprises:
selecting the second reference clock to be substantially similar to the first reference clock; and
selecting the second position to be different from the first position.

5. The method of claim 4, wherein selecting the second position comprises:
selecting the second position to be adjacent to the first position.

6. The method of claim 4, wherein selecting the second position comprises:
selecting the second position to be a predefined number of positions after the first position.

7. The method of claim 3, wherein assigning the second time schedule comprises:
selecting the second reference clock to be different from the first reference clock; and
selecting the second position to be substantially similar the first position.

8. The method of claim 7, wherein selecting the second reference clock comprises selecting the second reference clock to be a predefined amount of time after the first reference clock.

9. A method comprising:
an access network engaging in a respective existing communication session with each of a plurality of existing access terminals on a given wireless link, wherein engaging in each such respective existing communication session comprises sending a respective existing series of power control commands (PCCs) directed to a respective existing access terminal on the given wireless link according to a respective existing time schedule and in parallel with each other respective existing series of PCCs;
the access network deciding to initiate a new communication session with a new access terminal on the given wireless link;
in response to the deciding, the access network assigning a new time schedule for sending a new series of PCCs directed to the new access terminal on the given wireless link in parallel with each respective existing series of PCCs, wherein the new time schedule differs from at least one respective existing time schedule for sending a respective existing series of PCCs directed to a respective existing access terminal on the given wireless link; and
the access network engaging in the new communication session with the new access terminal on the given wireless link, wherein engaging in the new communication session comprises sending the new series of PCCs on the given wireless link according to the new time schedule and in parallel with each respective existing series of PCCs.

10. The method of claim 9, wherein:
engaging in a respective existing communication session with an existing access terminal comprises sending a respective series of frames to the existing access terminal according to a respective reference clock, each frame comprising a series of timeslots, and
sending a respective existing series of PCCs directed to the existing access terminal according to a respective existing time schedule comprises sending a respective PCC in a respective position of each respective timeslot in the respective series of frames.

11. The method of claim 10, wherein:
engaging in the new communication session comprises sending a new series of frames to the new access terminal according to a new reference clock, each frame comprising a series of timeslots, and
sending the new series of PCCs according to the new time schedule comprises sending a respective PCC in a new position of each respective timeslot in the new series of frames.

12. The method of claim 11, wherein assigning the new time schedule comprises:
selecting the new reference clock to be substantially similar to at least one respective reference clock of a respective access terminal, and
selecting the new position to be different than at least one respective position.

13. The method of claim 12, wherein selecting the new position comprises:
selecting the new position to be adjacent to a last assigned position.

14. The method of claim 12, wherein selecting the new position comprises:
  selecting the new position from a group of unassigned positions.

15. The method of claim 12, wherein:
  selecting the new reference clock to be substantially similar to at least one respective reference clock comprises selecting the new reference clock to be substantially similar to each respective reference clock.

16. The method of claim 11, wherein assigning the new time schedule comprises:
  selecting the new reference clock to be different from at least one respective reference clock of a respective access terminal; and
  selecting the new position to be the same as at least one respective position of a respective access terminal.

17. The method of claim 16, wherein selecting the new reference clock to be different from at least one respective reference clock of a respective access terminal comprises:
  selecting the new reference clock to be different from each respective reference clock.

18. The method of claim 16, wherein selecting the new reference clock comprises:
  selecting the new reference clock to be delayed a predefined amount of time relative to a respective reference clock.

19. The method of claim 16, wherein selecting the new reference clock comprises:
  selecting the new reference clock to be delayed an amount of time that is selected from a group of unassigned delay amounts.

20. A base station comprising:
  a first communication interface configured to (i) facilitate a first communication session with a first access terminal on a given wireless link and (ii) facilitate a second communication session with a second access terminal on the given wireless link;
  a second communication interface configured to facilitate communication with one or more access network entities;
  a processor;
  data storage; and
  program instructions stored in the data storage and executable by the processor to:
    engage in the first communication session with the first access terminal on the given wireless link, wherein engaging in the first communication session comprises sending a first series of power control commands (PCCs) directed to the first access terminal on the given wireless link according to a first time schedule;
    decide to initiate the second communication session with the second access terminal on the given wireless link;
    in response to the deciding, assign a second time schedule for sending a second series of PCCs directed to the second access terminal on the given wireless link in parallel with the first series of PCCs directed to the first access terminal, wherein the second time schedule differs from the first time schedule; and
    engage in the second communication session with the second access terminal on the given wireless link, wherein engaging in the second communication session comprises sending the second series of PCCs on the given wireless link according to the second time schedule and in parallel with the first series of PCCs.

* * * * *